(12) United States Patent
Giaume

(10) Patent No.: US 6,427,159 B1
(45) Date of Patent: Jul. 30, 2002

(54) ARITHMETIC UNIT, DIGITAL SIGNAL PROCESSOR, METHOD OF SCHEDULING MULTIPLICATION IN AN ARITHMETIC UNIT, METHOD OF SELECTIVELY DELAYING ADDING AND METHOD OF SELECTIVELY ADDING DURING A FIRST OR SECOND CLOCK CYCLE

(75) Inventor: Olivier Giaume, Biot (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/366,504

(22) Filed: Aug. 3, 1999

(51) Int. Cl.[7] .............................. G06F 7/38; G06F 7/52
(52) U.S. Cl. ...................... 708/523; 708/490; 708/620
(58) Field of Search .................................. 708/523, 524, 708/603, 620, 490

(56) References Cited

U.S. PATENT DOCUMENTS

| | | | |
|---|---|---|---|
| 4,142,242 A | 2/1979 | Duvochel et al. | 364/759 |
| 4,611,305 A | 9/1986 | Iwase | |
| 4,876,660 A | 10/1989 | Owen et al. | 364/754 |
| 4,891,779 A | * 1/1990 | Hasebe | 708/620 |
| 5,204,828 A | 4/1993 | Kohn | |
| 5,285,403 A | * 2/1994 | Quisquater et al. | 708/523 |
| 5,301,335 A | 4/1994 | Langan et al. | |
| 5,847,981 A | 12/1998 | Kelley et al. | |

FOREIGN PATENT DOCUMENTS

EP     0 730 223 A1    4/1996

OTHER PUBLICATIONS

A 25/50MHz Dual–Mode Parallel Multiplier/Accumulator—Session VIII: Signal and Data Processing Circuits, Welten et al., 1984 IEEE International Solid–State Circuits Conference, 3 pages.

\* cited by examiner

Primary Examiner—Tan V. Mai
(74) Attorney, Agent, or Firm—Peter Zawilski

(57) ABSTRACT

An arithmetic unit configured to perform multiply and add operations on three operands A, B and C, where A is the multiplicand, B is the multiplier and C is the addend. The arithmetic unit includes a multiplier unit having an input stage configured to receive operands A and B from a data pump and includes an output to provide a product AB. The arithmetic unit also includes a register having an input coupled to the multiplier unit output and an output and a multiplexer having a first data input coupled to the multiplier unit output, a second data input coupled to the register output, a toggle command input and a data output. A bypass decision block in the arithmetic unit includes an input stage configured to receive the operands A and B and includes an output coupled to a scheduler and to the toggle command input. The bypass decision block is configured to set the multiplexer to couple the first data input to the data output when most significant bits of the operands A and B have values below a first threshold. The arithmetic unit also includes an adder having a first data input coupled to the multiplexer data output configured to receive the product AB, a second data input configured to receive the addend C and an output to provide an output signal AB+C.

33 Claims, 2 Drawing Sheets

ARITHMETIC UNIT, DIGITAL SIGNAL PROCESSOR, METHOD OF SCHEDULING MULTIPLICATION IN AN ARITHMETIC UNIT, METHOD OF SELECTIVELY DELAYING ADDING AND METHOD OF SELECTIVELY ADDING DURING A FIRST OR SECOND CLOCK CYCLE

TECHNICAL FIELD

The present invention relates to an arithmetic unit and to a digital signal processor. The present invention also relates to a method of scheduling multiplication and addition in an arithmetic unit, a method of selectively delaying adding and a method of selectively adding during a first or second clock cycle.

BACKGROUND OF THE INVENTION

In many digital signal processors, dedicated blocks of circuitry carry out specific functions, such as multiplication or addition. A wide variety of digital building blocks are known for each function that is needed, such as multiplication and addition. Typically, the digital signal processor is designed by selecting and coupling together circuit blocks from a library of standardized designs.

In turn, the circuit blocks in the library represent a series of compromises between the amount of area each of the circuit blocks occupies on an integrated circuit, such as a digital signal processor, and the rapidity with which each of the circuit blocks is able to carry out the function associated with the circuit block. A circuit block that is constructed to reduce delay in providing an output signal is also very likely to require a relatively large circuit area and also a relatively large amount of electrical power. Conversely, circuit blocks that are optimized to require relatively little circuit area within an integrated circuit and to consume relatively less electrical power also tend to be poorly optimized for operational speed.

Digital signal processors typically include an ensemble of large numbers of interconnected circuit blocks. Each of these circuit blocks is selected to meet timing requirements for worst-case input signals, which are often input signals having a most significant bit that is a logical "1". Schedulers that coordinate interactions between these circuit blocks include timing constraints based on the worst-case inputs. As a result, operation of the ensemble of circuit blocks forming the digital signal processor is often slowed relative to what is necessary in order to process the actual input signals, because the actual input signals often differ from and are more benign than the worst-case input signals.

For example, ripple carry adders may be designed to be quite compact. However, because results ripple through ripple carry adders, and because this process takes time, the most significant output bits are available late in the time period allotted for operation of the ripple carry adder. A carry bit may be precalculated to make that portion of the result available earlier in time, but this requires additional circuitry, which also results in a doubling of the area required for the adder. Additionally, the amount of electrical power required in order to provide the result increases.

What is needed is a capability for obtaining results as rapidly as is possible from circuit blocks forming digital signal processors, without undue compromise of integrated circuit area or power dissipation.

SUMMARY OF THE INVENTION

In a first aspect, the invention provides an arithmetic unit configured to perform multiply and add operations on three operands A, B and C, where A is a multiplicand, B is a multiplier and C is an addend. The arithmetic unit includes a multiplier unit having an input stage configured to receive operands A and B from a data pump, and includes an output to provide a product AB. A register has an input coupled to the multiplier unit output and has an output. A multiplexer has a first data input coupled to the multiplier unit output, a second data input coupled to the register output, a toggle command input and a data output. The arithmetic unit also includes a bypass decision block having an input stage configured to receive the operands A and B, and includes an output coupled to a scheduler and to the toggle command input. The bypass decision block is configured to set the multiplexer to couple the first data input to the data output when most significant bits of the operands A and B have values below a first threshold. The arithmetic unit also includes an adder having a first data input coupled to the multiplexer data output and configured to receive the product AB, a second data input configured to receive the addend C and an output to provide an output AB+C.

In another aspect, the invention provides a digital signal processor. The digital signal processor includes a data input, a data pump having an input coupled to the data input and having an output, a scheduler having inputs and an output and an arithmetic unit having inputs coupled to the data pump output. The arithmetic unit operates on the data inputs to provide an output in response to commands from the scheduler. The arithmetic unit includes a multiplier unit having an input stage configured to receive operands A and B from the data pump and an output to provide a product AB. The arithmetic unit also includes a register having an input coupled to the multiplier unit output and having an output and a multiplexer having a first data input coupled to the multiplier unit output, a second data input coupled to the register output, a toggle command input and a data output. The arithmetic unit further includes a bypass decision block having an input stage configured to receive the operands A and B. and an output coupled to the scheduler and to the toggle command input. The bypass decision block is configured to set the multiplexer to couple the first data input to the data output when the operands A and B have values below a multiplier threshold $t_m$. The arithmetic unit additionally includes an adder having a first data input coupled to the multiplexer data output configured to receive the product AB, a second data input configured to receive the addend C and an output to provide an output AB+C.

In a further aspect, the invention provides a method of scheduling multiplication and addition in an arithmetic unit configured to multiply a multiplicand A and a multiplier B to provide a product AB and to add an addend C to the product AB to provide an output signal AB+C. The method includes coupling the multiplicand A and the multiplier B to first and second inputs to a multiplier. The multiplier provides the product AB at an output. The method also includes coupling the multiplicand A and the multiplier B to first and second inputs of a bypass decision block and determining, by the bypass decision block, when most significant bits of the multiplicand and the multiplier have values below a first threshold. The method further includes toggling a multiplexer to couple a first multiplexer data input coupled to the multiplier output to accept the product AB and couple the product AB from the first multiplexer data input to the multiplexer output when the bypass decision block determines that the most significant bits have values below the first threshold.

In another aspect, the invention provides a method of selectively adding a product AB to an addend C during a first or a second clock cycle in an arithmetic unit configured to multiply a multiplicand A and a multiplier B to provide the product AB and to add the addend C to the product AB. The method includes coupling, during the first clock cycle, the multiplicand A and the multiplier B to first and second inputs to a multiplier having an output to provide the product AB and coupling the multiplicand A and the multiplier B to first and second inputs of a bypass decision block during the first clock cycle. The method also includes determining, by the bypass decision block and during the first clock cycle, when the multiplicand A and the multiplier B have values above a multiplier threshold $t_m$ and coupling the product AB from the multiplier output to an adder input during a second clock cycle when the bypass decision block determines that the multiplicand A and the multiplier B have values above the multiplier threshold $t_m$. The method further includes coupling the product AB from the multiplier output to the adder input during the first clock cycle when the bypass decision block determines that the multiplicand A and the multiplier B do not have values above the multiplier threshold $t_m$.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the Progress of Science and useful Arts" (Article 1, Section 8).

Figure 1:
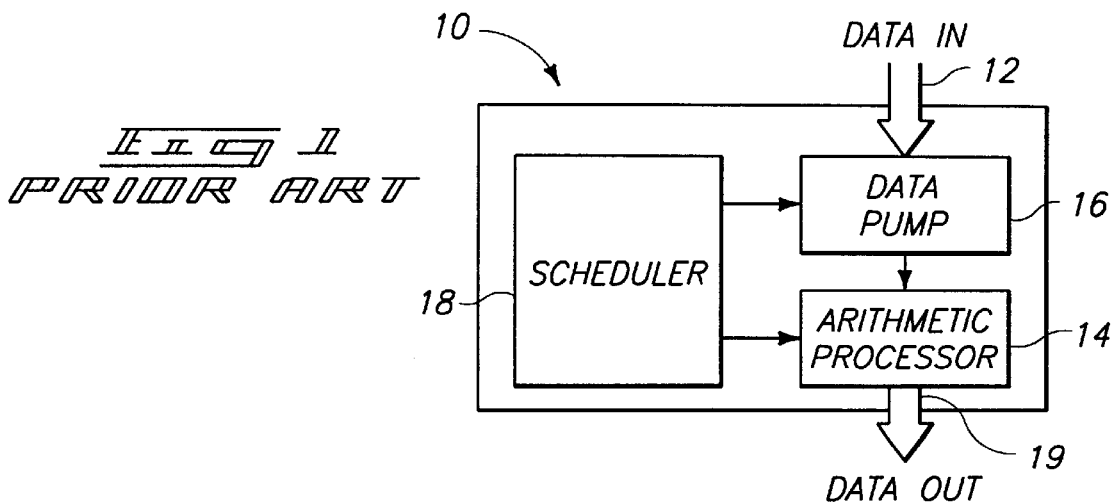
FIG. 1 is a simplified block diagram of a digital signal processing circuit, in accordance with the prior art.

FIG. 1 is a simplified block diagram of a digital signal processor 10, in accordance with the prior art. The digital signal processor 10 includes data inputs 12, arithmetic processing circuits 14, a data pump 16, a scheduler 18 and outputs 19. The digital signal processor 10 accepts input data at the data inputs 12 and supplies portions of the input data to the arithmetic processing circuits 14 through the data pump 16. The scheduler 18 orchestrates data input and arithmetic operations to provide a desired output signal at the data outputs 19.

The digital signal processor 10 may be configured to perform fast Fourier transforms (FFTs), inverse FFTs, FIR filtering and other tasks involved in transforming an input dataset to a form useful for further signal conditioning and communication tasks. Examples of applications for digital signal processors 10 include modems, digital video compression and voice coding.

Typically, the arithmetic processing circuits 14 include elements to carry out specified subtasks, such as multiplication or addition, that are necessary portions of the overall digital signal processing task of the digital signal processor 10. Each of these elements is chosen to be able to provide an individual result in a specified time, even when the element is provided with worst-case input signals. As a result, the elements are optimized for the worst case and the design does not allow the digital signal processor 10 to make adjustments for input values that result in more rapid operation of the element or subcircuit.

Elements such as adders and multipliers use architectures whereby output bit arrival, from least significant bit to most significant bit, is generally linear versus time. When it is possible to predict from the input values that the most significant bit or a group of most significant bits of the output from the element will be zero, only the remaining bits need actually be calculated in order to provide a valid result. In other words, when results within the element need only propagate partly through the element, the complete result is available at the output of the element earlier than when results must propagate all the way through the element to the most significant bit. When it can be easily and simply predicted from the input values that results within the element need only propagate partly through the element, it is possible to determine approximately when the complete result will be available.

Figure 2:
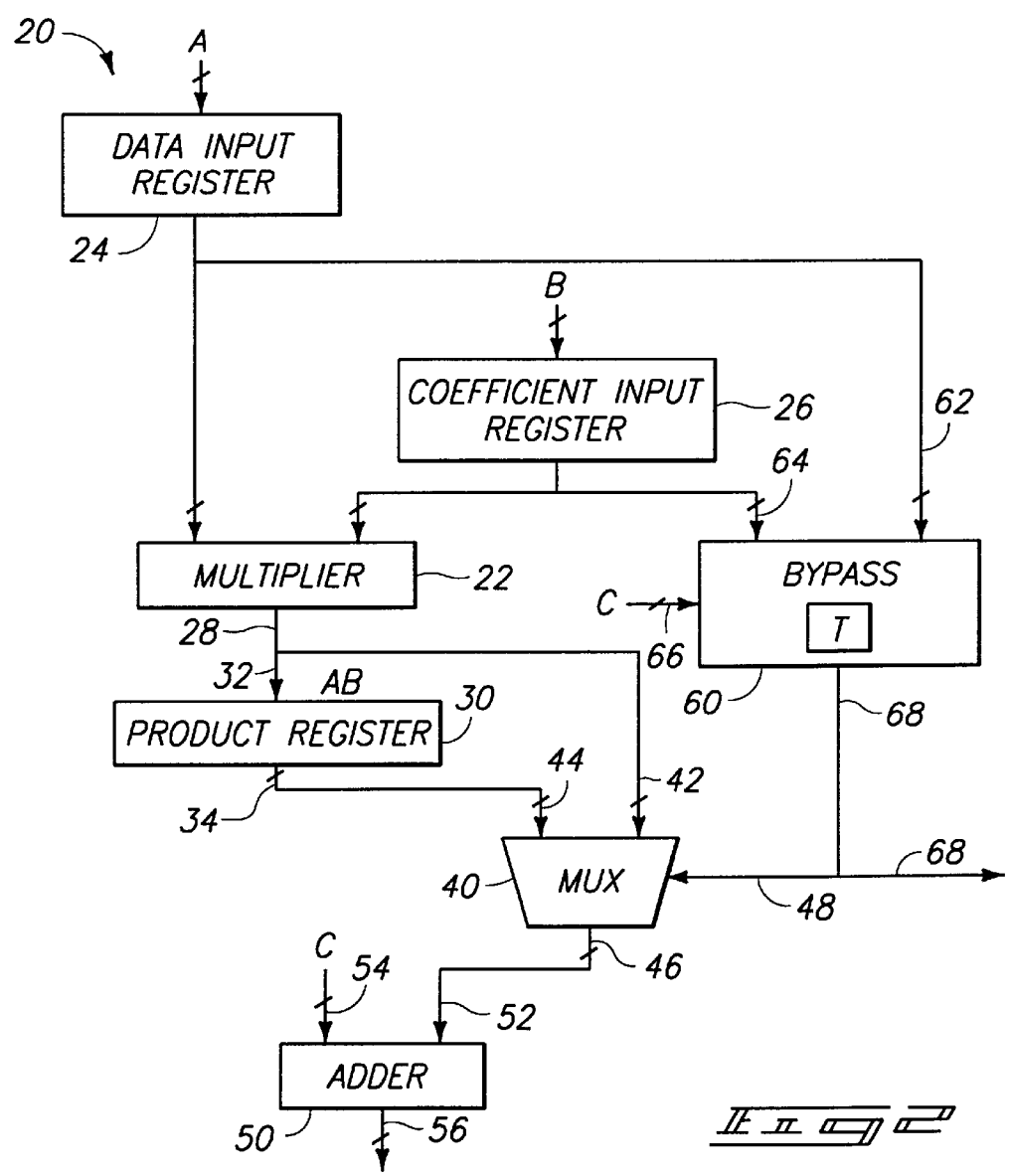
FIG. 2 is a simplified block diagram of an arithmetic unit, in accordance with an embodiment of the present invention.

FIG. 2 is a simplified block diagram of an arithmetic unit 20, in accordance with an embodiment of the present invention. The arithmetic unit 20 may be a portion of the arithmetic processing circuit 14 of FIG. 1 and includes a multiplier 22 having an associated data input register 24 to accept a multiplicand A from the data pump 16 of FIG. 1, an associated coefficient input register 26 to accept a multiplier B from the data pump 16 and a data output 28 to provide a product AB. The arithmetic unit 20 also includes a product register 30 having a data input 32 coupled to the multiplier data output 28 and a data output 34. A multiplexer MUX 40 has a first data input 42 coupled to the multiplier data output 28, a second data input 44 coupled to the product register data output 34, a multiplexer data output 46 and a toggle input 48.

An adder 50 has a first data input 52 coupled to the multiplexer data output 46, a second data input 54 to accept an addend C and an output 56. The adder 50 adds the product AB from the multiplexer data output 46 to the addend C from the second data input 54 to provide an output signal AB+C at the output 56.

A bypass decision block 60 has a first data input 62 coupled to the multiplier data input register 24 and thus to the multiplicand A, a second data input 64 coupled to the multiplier coefficient input register 26 and thus to the multiplier B and a third data input 66 coupled to the addend C that is input to the second adder data input 54. An output 68 of the bypass decision block 60 is coupled to the multiplexer toggle input 48 and to other digital signal processor circuitry, such as the scheduler 18 of FIG. 1.

In operation, the multiplier 22 multiplies the multiplicand or data A from the data input register 24 by the multiplier or coefficient B from the coefficient input register 26 to provide the product AB at the multiplier output 28. The time $T_{MULT}$ required for the multiplier 22 to carry out this multiplication depends on the values of the multiplicand A and the multiplier B. For example, when both the multiplicand A and the multiplier B have values of zero, the result is available at the multiplier output 28 almost immediately, following a setup time $T_{SETUP}$ needed in order to latch data in the input registers 24 and 26. However, when both the multiplicand A and the multiplier B have most significant bits having values of one, the product AB will take longer to be available at the multiplier output 28 because multiple sequential switching events are required in order to form the product AB.

As a result, it is possible to determine, at least for some values of multiplicand A and multiplier B, whether the product AB will be valid earlier or later in a clock cycle during which the multiplication is taking place. In one embodiment, the bypass decision block 60 includes a lookup table T. When values are present for the multiplicand A and the multiplier B, the lookup table T provides a decision bit reflecting the likelihood that the result will be available early in the clock cycle, for example during a first half of the clock cycle. The decision bit is provided at the output 68 and toggles the multiplexer 40.

In one embodiment, the lookup table T includes a first threshold $t_1$ and a second threshold $t_2$. When $A<t_1$ and $B<t_2$, the multiplier 22 will have finished operating early in the present clock cycle, and the decision bit from the bypass decision block 60 may be set to allow data to pass directly from the multiplier output 28 to the first adder data input 52.

For example, when the most significant bits of A and B are logical ones, $A>t_1$, $B>t_2$ and neither of the conditions is met. When one or more of these conditions is not met, the decision bit from the bypass decision block 60 is set to couple the first adder data input 52 to the register data output 34 and thus to delay adding the product AB to C until a next clock cycle.

Similarly, the adder 50 may provide a result following a delay $T_{ADD}$ and this may occur earlier or later in the clock cycle, depending on values for the addends to the adder 50. When the adder 50 is not able to complete adding the addends early in the cycle, the decision block 60 provides a decision bit that toggles the multiplexer 40 to couple the second data input 44 to the multiplexer data output 46, delaying coupling of the product AB from the multiplier 22 to the adder 50 until the next clock cycle. When the adder 50 is able to complete addition of the addends early in the cycle, and the multiplier output signal AB will be valid early enough in the clock cycle, the decision bit toggles the multiplexer 40 to couple the first data input 42 to the multiplexer data output 46 to provide the product AB to the adder 50 during the same clock cycle. As a result, the product register 30 stores the product AB only when either the product AB is not valid until late in the clock cycle or when the adder 50 is not able to complete adding the addends until late in the current clock cycle. When $T_{MULT}+T_{SETUP}+T_{BYPASS}+T_{ADD}<T_{PER}$, where $T_{BYPASS}$ represents the time required in order to toggle the multiplexer 40, the decision block 60 may toggle the multiplexer 40 to couple the product AB to the first input 52 to the adder 50 to obtain the result AB+C during a single clock period $T_{PER}$.

In one embodiment, the lookup table T includes a first threshold $t_1$, a second threshold $t_2$ and a third threshold $t_3$. When $A<t_1$ and $B<t_2$ and $C<t_3$, both the multiplier 22 and the adder 50 will have finished operating early in the present clock cycle, and the decision bit from the bypass decision block 60 is set to allow data to pass directly from the multiplier output 28 to the first adder data input 52.

When the result AB+C can be made available relatively early in the present clock cycle, the decision bit from the bypass decision block 60 toggles the multiplexer 40 to couple the first data input 42 to the multiplexer data output 46 and also signals the scheduler 18 of FIG. 1 to have the data pump 16 provide new inputs A, B and C to the arithmetic unit 20. When the result AB+C cannot be made available early in the present clock cycle, the decision bit toggles the multiplexer 40 to couple the second data input 44 to the multiplexer data output 46. As a result, the product AB is stored in the product register 30 until the next clock cycle, and then the product AB is added to C.

By adding the bypass decision block 60 and the multiplexer 40 to the arithmetic unit 20, the arithmetic unit 20 is able to recognize inputs A, B and/or C that permit early formulation of valid results to the signal output 56. When the values of the inputs A, B and/or C do not permit early access to valid intermediate or output signals, the bypass decision block 60 toggles the multiplexer 40 to couple data through the product register 30 to the second adder data input 54. A delay of one clock cycle is present between the multiplication and addition operations for these cases.

When values of the inputs A, B and/or C permit early access to valid intermediate or output signals, the bypass decision block 60 toggles the multiplexer 40 to bypass the product register 30 and also signals other circuitry in order to initiate a next arithmetic operation. As a result, the arithmetic unit 20 is able to operate more efficiently and more rapidly.

Figure 3:
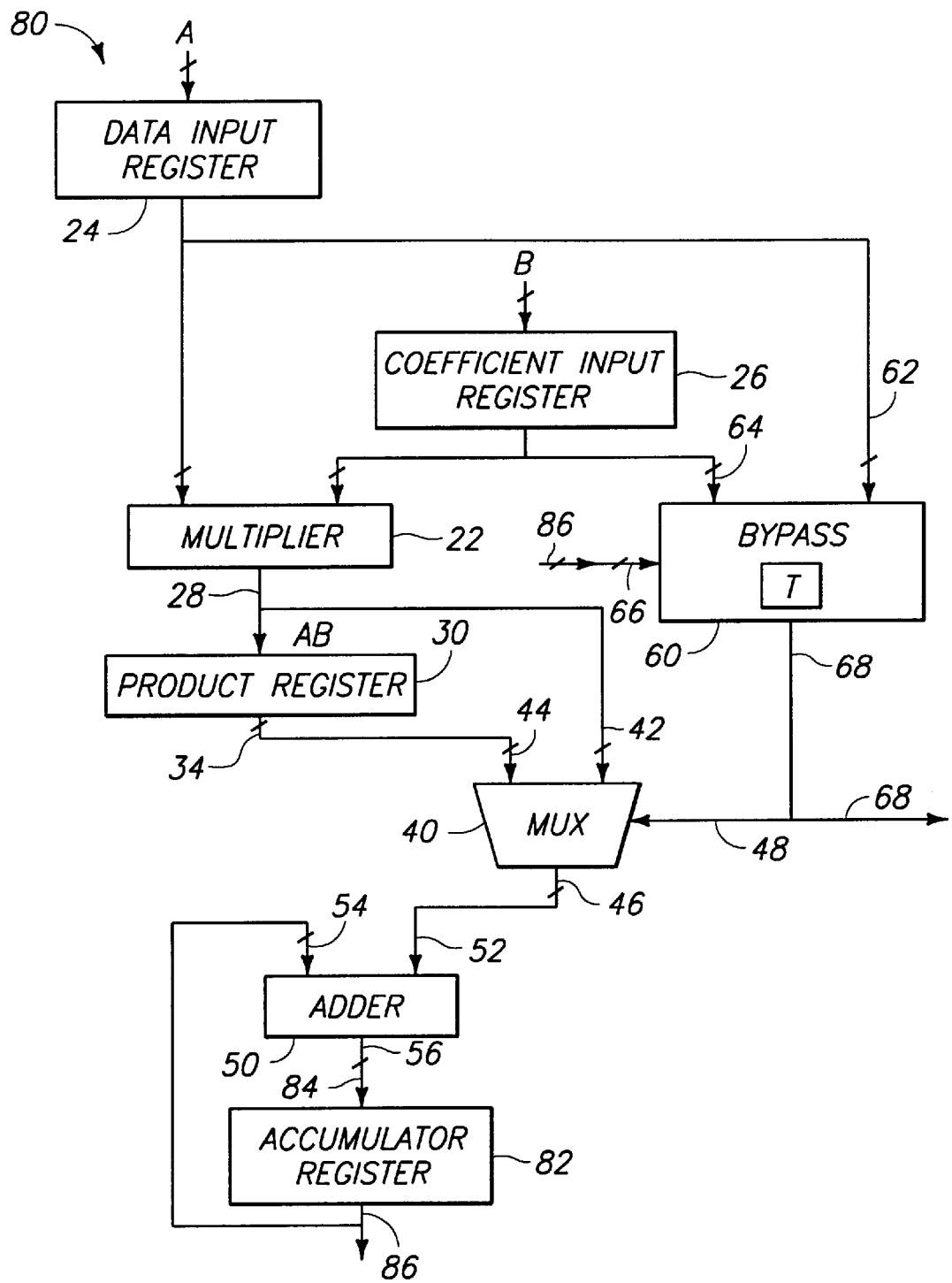
FIG. 3 is a simplified block diagram of an arithmetic unit, in accordance with an embodiment of the present invention.

FIG. 3 is a simplified block diagram of an arithmetic unit 80, in accordance with an embodiment of the present invention. Many elements used in the arithmetic unit 80 are identical to elements used in the arithmetic unit 20 of FIG. 2. These elements are given the same reference numbers as are used in FIG. 2 and explanation of them will not be repeated.

The arithmetic unit 80 is an example of a multiply accumulator ("MAC") and differs from the arithmetic unit 20 of FIG. 2 by including an accumulation register 82 having an input 84 and an output 86. The input 84 is coupled to the output 56 of the adder 50, and the output 86 is coupled to the input 54 to the adder 50 and to the third input 66 to the bypass decision block 60.

In operation, the accumulation register 82 normally stores a result appearing at the output 56 of the adder 50 from a first clock cycle and this result is added to the product AB from the multiplier 22 during a next clock cycle. However, when values of the operands A and B indicate that the multiplier 22 will have a valid product AB early in the clock cycle (e.g., during a first half of the clock cycle) and the value from the accumulator output 86 indicate that the adder 50 can accept a new product AB early in the clock cycle and provide a valid output signal at the output 86, the multiplexer 40 is toggled by the decision block to couple the product AB to the first adder input 52. As a result, the MAC 80 is able to complete the multiply accumulate operation in a single clock cycle and to notify, e.g., the scheduler 18 of FIG. 1 that the MAC 80 is ready to begin another multiply accumulate operation one clock cycle earlier than usual.

The arithmetic unit 80 finds application in digital signal processors such as the digital signal processor 10 of FIG. 1 in forming fast Fourier transform (FFT) and inverse FFT (IFFT) circuits, FIR filter circuits and other circuits requiring repeated multiplication and addition operations. By accelerating the rate at which at least some subtasks may be carried out, the MAC 80 of FIG. 3 or the arithmetic unit 20 of FIG. 2 allows for more rapid operation of digital signal processors 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An arithmetic unit configured to perform multiply and add operations on three operands A, B and C, A being a multiplicand, B being a multiplier and C being an addend, the arithmetic unit comprising:

a multiplier unit including an input stage configured to receive operands A and B from a data pump, the multiplier unit being configured to multiply A with B to provide a product AB, the multiplier unit including an output to provide the product AB;

a product register having an input coupled to the multiplier unit output, and having an output;

a multiplexer having a first data input coupled to the multiplier unit output, a second data input coupled to the product register output, a toggle command input and a data output;

a bypass decision block including an input stage configured to receive the operands A and B, and including an output coupled to a scheduler and to the toggle command input, the bypass decision block being configured to toggle the multiplexer to couple the first data input to the multiplexer data output when the operands A and B have values below a multiplier threshold; and an adder having a first data input coupled to the multiplexer data output and configured to receive the product AB, having a second data input configured to receive the addend C, the adder being configured to add the product AB to C, and the adder having an output to provide a sum AB+C.

2. The arithmetic unit of claim 1, further comprising an accumulation register having an input and an output, the accumulation register input being coupled to the adder output and the accumulation register output providing the addend C.

3. The arithmetic unit of claim 1 wherein the adder includes a ripple carry adder circuit.

4. The arithmetic unit of claim 1 wherein the adder includes a look ahead carry adder circuit.

5. The arithmetic unit of claim 1 wherein the bypass decision block input stage is configured to receive the operand C, the bypass decision block being configured to toggle the multiplexer to couple the first multiplexer data input to the multiplexer data output when the operand C has a value below an adder threshold and the operands A and B have values below the multiplier threshold.

6. The arithmetic unit of claim 1 wherein the bypass decision block input stage is configured to receive the operand C, the bypass decision block being configured to toggle the multiplexer to couple the second multiplexer data input to the multiplexer data output when the operand C has a value above an adder threshold or the operands A and B have values above the multiplier threshold.

7. The arithmetic unit of claim 1 wherein the bypass decision block is configured to toggle the multiplexer to couple the second multiplexer data input to the multiplexer data output when the operands A and B have values above the multiplier threshold.

8. The arithmetic unit of claim 7 wherein the bypass decision block input stage is configured to receive the operand C, the bypass decision block being configured to toggle the multiplexer to couple the second multiplexer data input to the multiplexer data output when the operand C has a value above an adder threshold.

9. The arithmetic unit of claim 1 wherein the bypass decision block is configured to toggle the multiplexer to couple the second multiplexer data input to the multiplexer data output when any of the operands A, B and C have a most significant bit that is a logical one.

10. The arithmetic unit of claim 1 wherein the bypass decision block is configured to toggle the multiplexer to couple the second multiplexer data input to the multiplexer data output when any of the operands A and B have a most significant bit that is a logical one.

11. The arithmetic unit of claim 1 wherein the multiplier unit, the register, the multiplexer, the bypass decision block and the adder comprise a single integrated circuit.

12. An arithmetic unit configured to perform multiply and add operations on three operands A, B and C, A being a multiplicand, B being a multiplier and C being an addend, the arithmetic unit comprising:

a multiplier unit including an input stage configured to receive operands A and B from a data pump, the multiplier unit being configured to multiply A with B to produce a product AB, and the multiplier unit including an output to provide the product AB;

a product register having an input coupled to the multiplier unit output, and having an output;

a multiplexer having a first data input coupled to the multiplier unit output, a second data input coupled to the product register output, a toggle command input and a data output;

a bypass decision block including an input stage configured to receive the operands A and B, and including an output coupled to a scheduler and to the toggle command input, the bypass decision block being configured to toggle the multiplexer to couple the first multiplexer data input to the multiplexer data output when the operands A and B have values below a multiplier threshold;

an adder having a first data input coupled to the multiplexer data output and configured to receive the product AB, having a second data input configured to receive the addend C, the adder being configured to add the product AB to C, and the adder having an output to provide a sum AB+C; and an accumulation register having an input and an output, the accumulation register input being coupled to the output of the adder and the accumulation register output providing the addend C.

13. The arithmetic unit of claim 12 wherein the bypass decision block is configured to toggle the multiplexer to couple the second multiplexer data input to the multiplexer data output when either of the operands A and B have a most significant bit that is a logical one.

14. The arithmetic unit of claim 12 wherein the bypass decision block is configured to toggle the multiplexer to couple the second multiplexer data input to the multiplexer data output when the addend C has a most significant bit that is a logical one.

15. A digital signal processor comprising:

a data input;

a data pump having an input coupled to the data input and an output;

a scheduler having inputs and an output; and an arithmetic unit having data inputs coupled to the data pump output and a command input coupled to the scheduler output, the arithmetic unit operating on data from the data inputs to provide an output in response to commands from the scheduler, the arithmetic unit comprising:

a multiplier unit including an input stage configured to receive operands A and B from the data pump, the multiplier unit being configured to multiply A with B to produce a product AB, and the multiplier unit including an output to provide a product AB;

a product register having an input coupled to the multiplier unit output, and having an output;

a multiplexer having a first data input coupled to the multiplier unit output, a second data input coupled to the product register output, a toggle command input and a data output;

a bypass decision block including an input stage configured to receive the operands A and B, and including an output coupled to the scheduler and to the toggle command input, the bypass decision block being configured to toggle the multiplexer to couple the first multiplexer data input to the multiplexer data output when the operands A and B have values below a multiplier threshold; and an adder having a first data input coupled to the multiplexer data output and configured to receive the product AB, having a second data input configured to receive the addend C, the adder being configured to add the product AB to C and the adder having an output to provide a sum AB+C.

16. The digital signal processor of claim 15, wherein the digital signal processor comprises an integrated circuit.

17. The digital signal processor of claim 15, wherein the bypass decision block is configured to toggle the multiplexer to couple the second multiplexer data input to the multiplexer data output when either of operands A and B have a most significant bit that is a logical one.

18. The digital signal processor of claim 15 wherein the bypass decision block is configured to toggle the multiplexer to couple the second multiplexer data input to the multiplexer data output when C has a most significant bit that is a logical one.

19. A method of scheduling multiplication in an arithmetic unit configured to multiply a multiplicand A and a multiplier B to provide a product AB comprising:

multiplying the multiplicand A and the multiplier B to provide the product AB;

coupling the product AB to a first data input to a multiplexer;

coupling the multiplicand A and the multiplier B to first and second inputs of a bypass decision block;

determining, by the bypass decision block, when the multiplicand A and the multiplier B have values below a multiplier threshold; and toggling the multiplexer to couple the first multiplexer data input to accept the product AB and couple the product AB from the first multiplexer data input to the multiplexer output when the bypass decision block determines that the multiplicand A and the multiplier B have values below the multiplier threshold.

20. The method of claim 19 wherein toggling the multiplexer comprises toggling the multiplexer couple the product AB to the multiplexer output during a present clock cycle when the bypass decision block determines that the multiplicand A and the multiplier B have values below the multiplier threshold.

21. The method of claim 19, further comprising:

coupling the addend C to a third input to the bypass decision block;

determining, by the bypass decision block, when most significant bits of the addend C have values below a first adder threshold; and toggling the multiplexer to couple the first multiplexer data input to the multiplexer output when the most significant bits of the addend have values below the first adder threshold.

22. The method of claim 19, further comprising:

determining, by the bypass decision block, when the multiplicand A and the multiplier B have values above the multiplier threshold;

storing an output signal from the multiplier in a product register having data inputs coupled to the multiplier output and having data outputs coupled to second multiplexer inputs when the multiplicand A and the multiplier B have values above the multiplier threshold; and toggling the multiplexer to couple the second multiplexer data input to the multiplexer output when the multiplicand A and the multiplier B have values above the multiplier threshold.

23. The method of claim 22, wherein determining when the multiplicand A and the multiplier B have values above the multiplier threshold comprises determining when either the multiplicand A or the multiplier B have a most significant bit that is a logical one.

24. The method of claim 19, further comprising:

coupling the addend C to a third input to the bypass decision block;

determining, by the bypass decision block, when the addend C has a value above an adder threshold;

storing an output signal from the multiplier in a product register having data inputs coupled to the multiplier output and having data outputs coupled to second multiplexer inputs when the addend C has a value above the adder threshold; and toggling the multiplexer to couple the second multiplexer data input to the multiplexer output when the addend C has a value above the adder threshold.

25. The method of claim 24, wherein determining when the addend C has a value above an adder threshold includes determining when a most significant bit of the addend C is a logical one.

26. A method of selectively delaying adding a product AB to an addend C in an arithmetic unit configured to multiply a multiplicand A and a multiplier B to provide the product AB and to add an addend C to the product AB comprising:

multiplying, during a first clock cycle, the multiplicand A and the multiplier B to provide the product AB;

coupling the multiplicand A and the multiplier B to first and second inputs of a bypass decision block during the first clock cycle;

determining, by the bypass decision block and during the first clock cycle, when the multiplicand A and the multiplier B have values above a multiplier threshold; and delaying coupling the product AB to a first adder input until a subsequent clock cycle when the bypass decision block determines that the multiplicand A and the multiplier B have values above the multiplier threshold;

receiving the addend C at a second adder input; and adding the product AB the addend C to provide a sum AB+C at an adder output.

27. The method of claim 26 wherein determining when the operands A and B have values above the multiplier threshold includes determining when either of the operands A and B have a most significant bit that has a value of one.

28. The method of claim 26 wherein determining when the multiplicand A and the multiplier B have values above the multiplier threshold comprises determining when either the multiplicand A and the multiplier B have most significant bits having a logical value of one.

29. The method of claim 26, further comprising:

determining, by the bypass decision block and during the first clock cycle, when the multiplicand A and the multiplier B have values below the multiplier threshold; and coupling the product AB to an adder input during the first clock cycle when the bypass decision block determines that the multiplicand A and the multiplier B have values below the multiplier threshold.

30. The method of claim 26 further comprising:

coupling the addend C to a third input to the bypass decision block during the first clock cycle;

determining, during the first clock cycle, when the addend C has a value greater than an adder threshold; and delaying coupling the product AB to the adder input when the addend C has a value greater than the adder threshold.

31. The method of claim 30 wherein determining when the addend C has a value greater than an adder threshold comprises determining when the addend C has a most significant bit having a value of logical one.

32. A method of selectively adding a product AB to an addend C during a first or a second clock cycle in an arithmetic unit configured to multiply a multiplicand A and a multiplier B to provide the product AB and to add the addend C to the product AB comprising:

coupling, during the first clock cycle, the multiplicand A and the multiplier B to first and second inputs to a multiplier having an output to provide the product AB;

coupling the multiplicand A and the multiplier B to first and second inputs of a bypass decision block during the first clock cycle;

determining, by the bypass decision block and during the first clock cycle, when the multiplicand A and the multiplier B have values above a mutiplier threshold;

coupling the product AB from the multiplier output to a first adder input during a second clock cycle when the bypass decision block determines that the multiplicand A and the multiplier B have the values above the multiplier threshold; and coupling the product AB from the multiplier output to the first adder input during the first clock cycle when the bypass decision block determines that the multiplicand A and the multiplier B do not have values above the multiplier threshold;

coupling the addend C to a second adder input;

adding the product AB to the addend C to provide a sum AB+C.

33. The method of claim 32 wherein determining when the operands A and B have values above a multiplier threshold includes determining when either of the operands A and B have a most significant bit that has a logical value of one.

* * * * *